Feb. 27, 1940.                E. J. PROTIN                2,191,915
                          THREAD-CUTTING MACHINE
                          Filed April 11, 1939
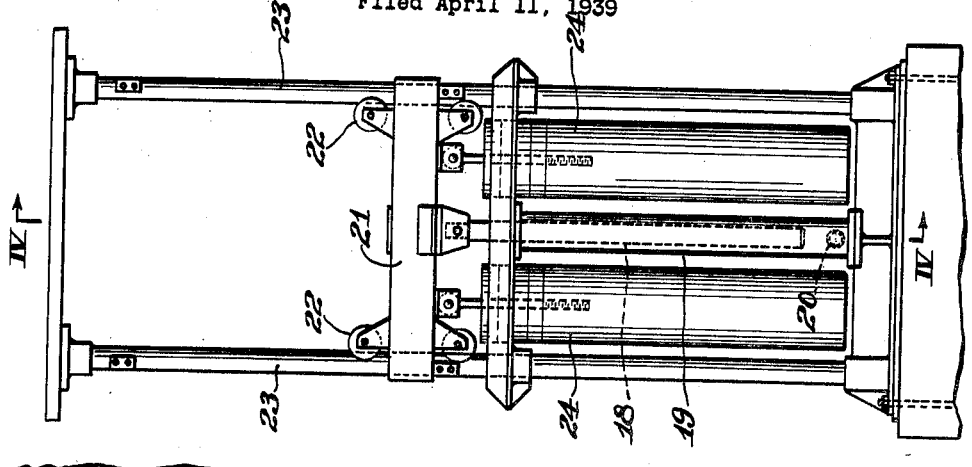
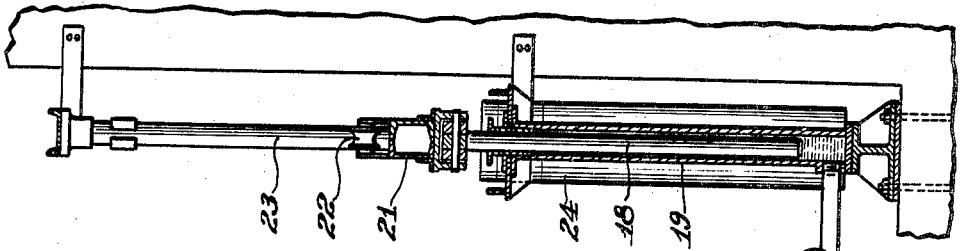
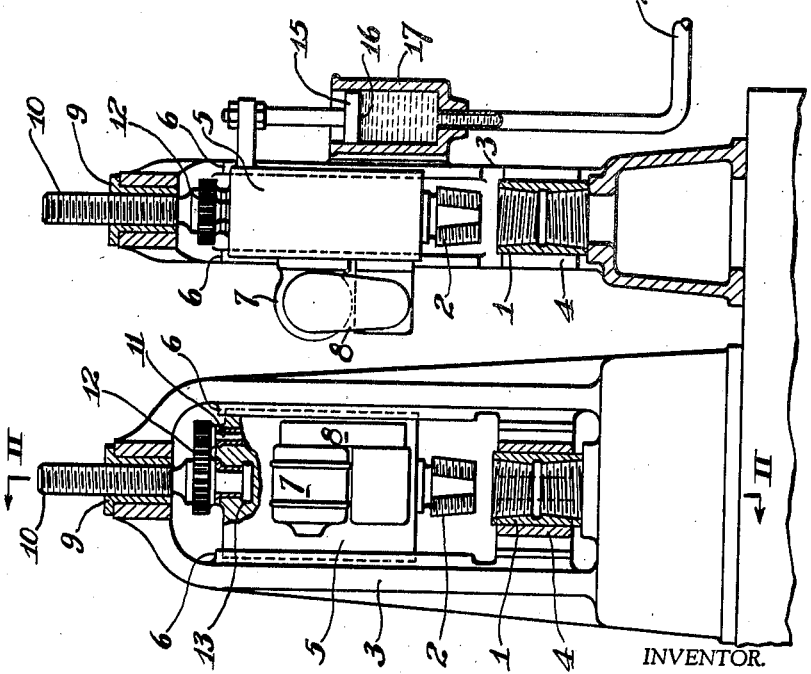
INVENTOR.
Edward J. Protin
BY Brown, Critchlow & Flick
his ATTORNEYS Patented Feb. 27, 1940

2,191,915

UNITED STATES PATENT OFFICE 2,191,915

THREAD-CUTTING MACHINE

Edward J. Protin, Charleroi, Pa., assignor to Pittsburgh Steel Company, Pittsburgh, Pa., a corporation of Pennsylvania Application April 11, 1939, Serial No. 267,220

5 Claims. (Cl. 10—105)

This invention relates to thread-cutting machines and is concerned particularly with apparatus for improving the operation of the driving mechanism to the end that threads may be cut more accurately.

The invention will be described in connection with the accompanying diagrammatic drawing, of which Fig. 1 is a front elevation, partly in section, of a machine for cutting threads on pipe couplings; Fig. 2 is a vertical section of the machine along the plane II—II of Fig. 1; Fig. 3 is an elevation of control apparatus associated with the thread-cutting machine; and Fig. 4 is a vertical sectional view of the control apparatus taken on the line IV—IV, Fig. 3.

Normally, threads are produced by machines which impart to the cutting die and the work two simultaneous, yet distinct movements relative to one another. The thread-cutting machine causes the die and work to be rotated relative to one another, by rotating either one; and it causes them to move axially of one another, by moving either the work or die along the axis of the desired threads.

While various types of machinery are used, it is common to achieve this relative axial movement by providing a movable head which is adapted to move back and forth along the axis of the desired thread, as for example by being slidably mounted upon guides which are parallel to this axis. When one member, say the die, is mounted stationarily at one point on the axis, and the work is mounted upon the movable head, relative axial movement of the die and work is effected by moving the head toward the die.

This type of machinery is illustrated in the drawing in a machine for cutting threads in a pipe coupling 1 by means of a die 2. A main frame 3 supports coupling 1 in a fixed axial position by means of a chuck 4, and die 2 is mounted upon a head 5 which is movable along two guides 6 which are in turn supported by frame 3 and are parallel to the axis of the desired threads.

Means for rotating die 2 and coupling 1 relative to one another may be of various types, there being shown, by way of illustration, a motor 7 mounted upon movable head 5 which, acting through a gear train 8, rotates die 2, while coupling 1 remains stationary. Thus by rotating die 2 and moving head 5 down toward coupling 1, a spiral thread is cut in the coupling.

So long as this relative rotation continues at a constant rate, which normally is the case, the production of a uniform spiral thread necessitates and requires that the die and work move axially of one another at a constant rate. If, for example, head 5 descends at a varying or jerky speed, as by reason of play in the driving connection, the pitch and number of threads per inch vary over the length of the thread. Accordingly, as the speed of head 5 is fast or slow, the number of threads per inch are too few or too numerous, so that the accuracy and uniformity of the thread directly depends upon the constancy of this rate of relative axial movement.

There are in use numerous means which effect a fairly constant rate of axial movement between the die and work. In the drawing, there is illustrated one such means in which movable head 5 is driven down toward coupling 1 by the rotation of one of two engaged threaded members. A nut 9 is mounted within frame 3 and is thus fixed axially of coupling 1. A threaded spindle 10 engages this nut and is rotatably mounted within head 5. Upon the rotation of this spindle by motor 7, acting through gears 8, shaft 11 and gears 12, the spindle is caused by its threaded connection with nut 9 to move axially toward coupling 1 and, acting upon a thrust bearing 13 in head 5, it drives this head and die 2 along guides 6 toward coupling 1. Since spindle 10 is rotated at a constant rate and since the threads upon it and upon nut 9 are regular, the rate of axial movement of head 5 and die 2 toward coupling 1 is constant.

But one common fault with any of these various mechanical means for effecting axial movement between the die and threadable member, arises from the fact that there is between the parts of the mechanism considerable play in the line of this desired movement. Thus, with the machine illustrated in the drawing, wear of the complementary threads upon nut 9 and spindle 10 causes loose interengagement and permits these members to play axially of one another. Similarly, nut 9 may fit loosely in frame 3 and be capable of playing axially of this frame and hence axially of coupling 1. And, spindle 10 may be loosely mounted in head 5 and thus be capable, whenever the driving pressure is released, of separating from thrust bearing 13 and moving axially of the head.

Such looseness, of course, has no detrimental effect so long as the axial movement of head 5 is met by constant resistance in the cutting of the thread, for such constant resistance must be continuously overcome by the driving mechanism, and, acting continuously against one another, the parts are not able to play. But frequently resistance in the cutting is not constant and play, creeping into the action of the driving mechanism, causes head 5 to pursue an uneven axial rate, and this unevenness, presenting itself between the die and work, causes an imperfect thread.

It has long been sought to provide some satisfactory apparatus which can create, in addition to the resistance due to cutting, forces which resist the axial movement of head 5 and hence combat and reduce play which otherwise results through unevenness of the cutting resistance. This additional resistive force tends to put the driving mechanism under a constant load which admits no play, so that, in the mechanism illustrated, such forces, by resisting axial movement of head 5, require spindle 10 constantly to press against thrust bearing 13, necessitate a firm and tight engagement between the threads of spindle 10 and nut 9, and cause nut 9 to be seated firmly against frame 3.

It is naturally desirable that these additional resistive forces be as small as possible, since this lessens the load upon the driving mechanism and reduces wear on the driving parts. But, so long as it is low, it must be quite constant, for material variations in a low force, especially if speedy, so reduce its effective resistance that play and looseness may creep into the driving mechanism and cause defective threads to be produced.

In the past there has been provided no satisfactory apparatus which produces a constant resistive force upon a movable head throughout its entire axial movement. If a constant force is produced, the apparatus is bulky and expensive and interferes with the normal threading machinery. If it is simple, it does not produce a constant resistive force.

Accordingly an object of this invention is to provide, for combatting and reducing axial play in a movable head, apparatus which produces a constant resistive force throughout the axial movement of this head, and yet which does not interfere with the normal working of the threading machine and is inexpensive, simple, and has other advantages.

To attain this object I have found the most practicable and satisfactory apparatus to be one in which liquid under pressure is utilized to resist the axial movement of the head. Briefly, I provide an abutment, such as a piston, upon the movable head and a freely movable plunger. Then I provide means for entrapping liquid between the piston and movable plunger, so that pressure created by the plunger is transmitted to the piston, or in other words, so that the piston supports the plunger. With the plunger having sufficient weight to create a desired pressure, this pressure is transmitted through the entrapped liquid to the piston and there acts as a force tending to hold back the piston and hence the movable head.

As illustrated in the drawing, there is attached to head 5 a piston 15 whose pressure-receiving face 16 is so positioned that liquid pressure upon it resists any movement of the head along guides 6 toward coupling 1.

Since pressure must be applied to piston 15 throughout the entire axial travel of the head, this piston is slidably received within a suitable housing 17, preferably in the form of a cylinder, and between the piston and housing a pressure-tight seal is provided.

To create liquid pressure I provide a freely movable plunger 18 which is slidably received within a second housing 19, also preferably in the form of a cylinder, and means are provided for conducting liquid and liquid pressure back and forth between these two housings. As shown, such means comprise a conduit 20 connecting the chamber of housing 17 with that of housing 19.

Lastly, means are provided for lending a constant force to plunger 18. If it is of the correct weight, the plunger may be used by itself, but normally some additional force is required, and I preferably provide for this purpose apparatus by which additional weights are supported upon plunger 18. Connected to the top of plunger 18 is a cross head 21 which, through rollers 22, is guided up and down along two guide bars 23. Then from cross head 21 are suspended objects 24 of sufficient weight to attain the desired force.

When the space within the two housings and the conduit is filled with liquid, there is formed between piston 15 and plunger 18 a trapped column of liquid. As head 5 moves back and forth, piston 15 displaces more or less liquid in housing 17 and this liquid traveling back and forth through conduit 20 raises and lowers plunger 18 in accordance with this displacement. But, since, regardless of its position, plunger 18 exerts a constant force upon the liquid, piston 15 is likewise, regardless of its position, placed under constant pressure, and it follows that, as movable head 5 is driven along the axis of the desired threads, its axial movement is resisted by a constant force which combats and reduces the play in the driving members.

I have found that since the force exerted by plunger 18 is quite constant, it need be great enough to apply only relatively small resistance to the driving mechanism. With the machine disclosed, in which head 5 is driven downward along a vertical axis, I normally load plunger 18 with sufficient weights to balance head 5 and in addition exert a small resistive force against the driving mechanism. When head 5 is driven along a vertical axis, the force exerted by plunger 18, not having to balance head 5, is correspondingly less.

With the apparatus provided according to my invention the resistance offered to the moving head is constant, since the force exerted by plunger 18 is constant. The result is that the effective compressive force may be made quite small, for there being no variations, there can be no play.

Moreover, with the fluid system thus provided, great flexibility and simplicity is introduced. The pressure-creating apparatus may be, and preferably is, located at a distance from the thread-cutting machine and this does not clutter up and complicate the actual cutting machine. This is one marked advantage over any mechanical apparatus which must be located adjacent the moving head. The construction of the fluid system, the plunger and methods of weighting it, is simple and inexpensive, and moreover one plunger apparatus may be utilized with two or more thread-cutting machines by simply extending conduits from each of the machines to the control apparatus.

According to the provisions of the patent statutes I have explained the principle and construction of my invention, and have illustrated and described what I now consider to be its best embodiment. However, I desire to have it understood that, within the scope of the appended claims, the invention may be practiced otherwise than as specifically illustrated and described.

I claim:

1. In a thread-cutting machine having a movable head for effecting relative axial movement between a die and work to be threaded, apparatus for reducing play in said head comprising a piston connected to said head, a freely movable plunger, and means for entrapping liquid between said piston and said plunger, said plunger being weighted to maintain a constant pressure on the liquid.

2. In a thread-cutting machine having a movable head for effecting relative axial movement between a die and work to be threaded, apparatus for reducing play in said head comprising a piston connected to said head, a freely movable plunger, housings slidably receiving said piston and plunger, and a liquid conduit connecting said housings, whereby liquid is entrapped between said piston and plunger, said plunger being weighted to maintain a constant pressure on the liquid.

3. In a thread-cutting machine having a movable head for effecting relative axial movement between a die and work to be threaded, apparatus for reducing play in said head comprising a piston connected to said head, a freely movable plunger, cylinders slidably receiving said piston and plunger, and a liquid conduit connecting said cylinders, whereby liquid is entrapped between said piston and plunger, said plunger being weighted to maintain constant pressure upon the liquid.

4. In a thread-cutting machine having a movable head for effecting relative axial movement between a die and work to be threaded, apparatus for reducing play in said head comprising a piston connected to said head, a freely movable plunger, means for entrapping liquid between said piston and said plunger, and a weighty member supported by said plunger upon said fluid, said plunger thus being effective to maintain constant pressure upon the liquid.

5. In a thread-cutting machine having a movable head for effecting relative axial movement of a die and work to be threaded, apparatus for reducing play in said head comprising a piston connected to said head, a movable plunger, means for entrapping liquid between said piston and plunger, a cross head supported by said plunger, and a weighty member supported by said cross head, said plunger being effective to maintain constant pressure upon the liquid.

EDWARD J. PROTIN.